United States Patent [19]

Hoeschele

[11] Patent Number: 5,049,648

[45] Date of Patent: Sep. 17, 1991

[54] THERMOPLASTIC COPOLYESTER ELASTOMER BINDER

[75] Inventor: Guenther K. Hoeschele, Wilmington, Del.

[73] Assignee: E. I. du Pont de Nemours and Company, Wilmington, Del.

[21] Appl. No.: 245,151

[22] Filed: Sep. 16, 1988

Related U.S. Application Data

[63] Continuation-in-part of Ser. No. 140,251, Dec. 31, 1987, abandoned.

[51] Int. Cl.$^5$ ............................................. C08G 63/66
[52] U.S. Cl. .................................. 528/301; 528/308.7
[58] Field of Search ............................. 528/308.7, 301

[56] References Cited

U.S. PATENT DOCUMENTS

| | | | |
|---|---|---|---|
| 4,335,188 | 6/1982 | Igi et al. | 528/308.7 |
| 4,419,507 | 12/1983 | Sublett | 528/308.7 |
| 4,452,853 | 6/1984 | Schade et al. | 528/308.7 |
| 4,500,575 | 2/1985 | Taira et al. | 428/35 |
| 4,650,617 | 3/1987 | Kristofferson et al. | 264/3.3 |

FOREIGN PATENT DOCUMENTS 101018 6/1982 Japan .

OTHER PUBLICATIONS

J. R. Wolfe, Jr., A.C.S. Adv. Chem. Ser. (1979), 176, 129.
A. Ghaffer et al., Br. Polym. J., 10, 115 (1978).

*Primary Examiner*—Morton Foelak
*Assistant Examiner*—Dennis R. Daley

[57] ABSTRACT

A copolyester of long chain and short chain ester units, said long chain ester units being represented by the structure:

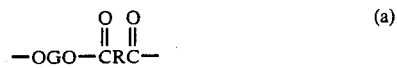

and said short chain ester units being represented by the structure:

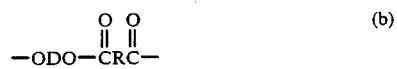

wherein
G is a divalent radical remaining after removal of terminal hydroxyl groups from a poly(alkylene oxide) glycol;
R is a divalent radical remaining after the removal of carboxyl groups from a dicarboxylic acid; and
D is a divalent radical remaining after removal of hydroxyl groups from a low molecular weight diol;
with the proviso that the short chain ester units constitute about 25–65% by weight of the copolyester, at least about 75% of the R groups are 1,3-phenylene radicals, at least about 75% of the D groups are 1,4-butylene radicals, and the sum of the percentages of the R groups which are not 1,3-phenylene radicals and the D groups which are not 1,4-butylene radicals cannot exceed about 25%; said copolyester being further characterized by a melt index at 120° C. by ASTM D1238 of about 2–25 gram/10 minutes.

6 Claims, No Drawings

THERMOPLASTIC COPOLYESTER ELASTOMER BINDER

BACKGROUND OF THE INVENTION

This is a continuation-in-part of application Ser. No.07,140,251, filed Dec. 31, 1987, now abandoned.

Gun propellant compositions which exhibit low vulnerability to heat, flame, impact, friction, etc. can be made by binding small particles of oxidizers such as HMX (cyclotetramethylene tetranitramine) and RDX (cyclotrimethylene trinitramine) with rubbery thermoset polymers such as polyurethane elastomers as described in U.S. Pat. No. 4,650,617. Thermoset polyurethane binders are advantageous in that the initial mixture of polyol and polyisocyanate is a liquid exhibiting a relatively low viscosity which facilitates mixing of the oxidizer and the binder with low shear at acceptable mixing temperatures. The resulting blend is then extruded to form propellant grains after which cure of the thermoset binder is completed in a further step. A disadvantage associated with the polyurethanes which is typical for thermoset binders is that curing; i.e., reaction of polyisocyanate and polyol, begins as soon as the two ingredients are brought together and continues throughout the steps of blending with the oxidizer and extrusion to form grains. As a consequence, the viscosities of the binder and the resulting blend with the oxidizer increases as processing continues. In batch operations, this means that the blend being extruded into grains will be more viscous toward the end of a run than the material initially extruded. The larger the batch size, the more pronounced this effect becomes. By operating continuously, the problem of increasing viscosity can be avoided, but is replaced by metering problems of the two liquids for the binder and of the solid oxidizer, all three of which must be supplied in constant proportions to guarantee the performance of the propellant. In either batch or continuous operation any interruption of the process due to mechanical failure or power-failure for instance leaves one with substantial amounts of a viscous blend which will cure in place to an intractable solid mass of propellant which can be removed only with difficulty and possible hazard.

A rubbery thermoplastic binder which had a suitable melting point and low enough viscosity to permit blending with the oxidizer and at the same time possessed adequate physical properties at temperatures to which the propellant grains might be exposed in storage would eliminate substantially all the problems associated with thermoset binders. Commercial grades of most available thermoplastic elastomers are generally far too viscous and high melting to even be considered as propellant binders. This is not surprising since it is normally desirable to have polymers which are useful at elevated temperatures. It is also known that in general, the higher the melt viscosity of a polymer, the better will be its physical properties.

Copolyetherester elastomers derived from terephthalic acid, 1,4-butanediol and poly(alkylene oxide) glycols are well known commercial rubbery thermoplastics which exhibit relatively low melt viscosities at low shear ratios compared to other thermoplastic elastomers. These commercial materials are much too high melting for use as propellant binders and as manufactured, are too viscous for blending with oxidizer particles. It is also characteristic of those commercial polymers that their physical properties are seriously diminished when the polymer is prepared so that its molecular weight and melt viscosity are lower; see U.S. Pat. No. 3,651,014 to Witsiepe, column 10.

In the course of research conducted to study the effect of structural variations on the properties of copolyetheresters, a number of copolyetheresters having melting points substantially below the melting points of commercial copolyetheresters have been prepared; J. R. Wolfe, Jr., ACS Avd. Chem. Ser. 176, 129 (1979); Ghaffar and Goodman, Br. Polym. J. 5, 315 (1973). Generally these research polymers had high molecular weights and were therefore too viscous in the melt to be useful as propellant binders.

Therefore, a need exists to find a thermoplastic elastomer, such as a copolyetherester, which has both a low melting point and low melt viscosity while it still retains useful physical properties.

SUMMARY OF THE INVENTION

A polymer which is useful as a thermoplastic rubbery binder for oxidizer particles, such as HMX and RDX, for the preparation of low vulnerability gun propellants is provided by a segmented thermoplastic copolyester elastomer consisting essentially of a multiplicity of recurring intralinear long chain and short chain ester units connected head-to-tail through ester linkages, said long chain ester units being represented by the following structure:

and said short chain ester units being represented by the following structure:

wherein:

G is a divalent radical remaining after removal of terminal hydroxyl groups from poly(alkylene oxide) glycols having a carbon-to-oxygen ratio of about 2.0–4.3 and a molecular weight of about 600–6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250;

with the proviso that the short chain ester units constitute about 25–65% by weight of the copolyester, at least about 75% of the R groups are 1,3-phenylene radicals, at least about 75% of the D groups are 1,4-butylene radicals, and the sum of the percentages of the R groups which are not 1,3-phenylene radicals and of the D groups which are not 1,4-butylene radicals cannot exceed about 25%; said copolyester being further characterized by a melt index at 120° C. by ASTM-D1238 of about 2-25 grams/10 minutes.

DETAILED DESCRIPTION OF THE INVENTION

The polymer of the present invention is prepared by melt condensation of isophthalic acid or its ester-forming equivalents (optionally containing up to 25 mole % of at least one other dicarboxylic acid especially terephthalic acid or its ester-forming equivalents), 1,4-butanediol or its ester forming equivalents (optionally containing up to 25 mole % of at least one other low molecular weight diol) and a poly(alkylene oxide) glycol having a number average molecular weight of 600–6000 and a carbon-to-oxygen ratio of about 2.0–4.3.

Representative poly(alkylene oxide) glycols which provide the diradical —G— include poly(ethylene oxide) glycol, poly(propylene oxide) glycol, poly(tetramethylene oxide) glycol, ethylene oxide-capped poly(propylene oxide) glycol and random copolyether glycols of ethylene oxide with propylene oxide and tetrahydrofuran with ethylene oxide or 3-methyl-tetrahydrofuran. Poly(ethylene oxide) glycol and poly(tetramethylene oxide) glycol are preferred.

Included among the low molecular weight diols (other than 1,4-butanediol) which may be used to provide —D— diradicals are acyclic, alicyclic and aromatic dihydroxy compounds. Preferred are diols with 2–15 carbon atoms such as ethylene, propylene, isobutylene, pentamethylene, 2,2-dimethyltrimethylene, hexamethylene and decamethylene glycols, 1,4-butenediol, dihydroxy cyclohexane and cyclohexane dimethanol. Especially preferred are aliphatic diols containing 2–8 carbon atoms. Equivalent ester-forming derivatives of diols are also useful (e.g. ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (other than isophthalic acid) which may be used to provide —R— diradicals are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 is included provided the acid has a molecular weight below about 300. The dicarboxylic acids can contain any substituent groups which do not substantially interfere with the copolyester polymer formation and use of the polymer in the elastomer compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allyl-malonic acid, 4-cyclohexane-1,2-dicarboxylic acid, 2-ethyl suberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylene-bis(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and terephthalic acid, bibenzoic acid, substituted dicarboxy compounds with two benzene nuclei such as bis(p-carboxyphenyl) methane, p-oxy(p-carboxyphenyl) benzoic acid, ethylene-bis(p-oxybenzoic acid) 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1$–$C_{12}$ alkyl and ring substitution derivatives thereof such as halo, alkoxy, and aryl derivatives. Hydroxyl acids such as p-(β-hydroxy-ethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., phthalic and terephthalic acids.

Isophthalic acid (and a second dicarboxylic acid if present) is preferably introduced into the polymer in the form of a di-lower alkyl ester of which dimethyl isophthalate is especially preferred. 1,4-Butanediol (and a second low molecular weight diol if present) is preferably used as such, but derivatives such as the diacetate can be used.

A preferred procedure consists of heating a mixture of dimethyl isophthalate a molar excess of 1,4-butanediol and a poly(alkylene oxide) glycol in the presence of an esterification catalyst at 150° to 260° C. while distilling off methanol formed by ester interchange. This procedure results in the preparation of a low molecular weight prepolymer which is increased in molecular weight by polycondensation involving distillation of excess 1,4-butanediol at pressures of less than 133 Pa at temperatures of 240°–260° C. The polycondensation should be allowed to proceed only to the point at which the polymer has a suitable melt index of 2–25 g/10 min at 120° C.; preferably 4–15 g/10 min. at 120° C. By measuring the power required to agitate the polymer during the polycondensation it is possible to stop the reaction when a polymer having the required melt index has been obtained once a correlation has been established between melt index and power requirements for the reaction vessel being used. Either batch or continuous methods can be used for any stage of copolyester polymer preparation.

A variety of esterification catalysts can be used to prepare the polymer, but organic titanates such as tetrabutyl titanate are preferred. In general, it is desirable to add a small amount of an antioxidant along with the monomers required to prepare the polymer. Representative antioxidants include secondary aromatic amines such as 4,4'-bis- α,α-dimethylbenzyl) diphenylamine and phenols such as 1,3,5-trimethyl-2,4,6-tri[3,5-di-tert.-butyl-4-hydroxy benzyl]benzene and N,N'-hexamethylenebis(3,5-di-tert-butyl-4-hydroxy-hydrocinnamamide). Optionally a minor amount of a branching agent such as trimellitic anhydride may be used in conjunction with the other monomers to enhance the polymerization kinetics; see U.S. Pat. No. 4,013,624 to Hoeschele.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated are largely a function of the amounts of the diols present, their boiling points, and relative reactivities. The total amount of diol incorporated is still the difference between moles of diacid and polymeric glycol.

As previously indicated the polymer should contain 25 to 65% by weight of short chain ester units. Polymers containing less than 25% by weight short chain ester units exhibit inferior physical properties while polymers containing greater than 65% by weight short chain ester units have poorer low temperature properties because of their higher glass transition temperatures. Polymers containing 30 to 50% by weight of short chain ester units are generally preferred.

The melting points of the polymers of this invention are a function of the mole fraction of butylene isophthalate units contained in the polymer based on the total moles of short and long chain ester units present. The higher the mole fraction, the higher the melting point. The melting point can be lowered by introducing a second dicarboxylic acid and/or a second low molecular weight diol. It can also be lowered by reducing the weight proportion of short chain ester units or by using a poly(alkylene oxide) glycol having a low molecular weight. When preparing polymers containing about 25 weight % short chain ester units, it may be desirable to use only isophthalic acid and butanediol to form the short chain ester units and to use a poly(alkylene oxide) glycol in the upper part of the 600–6000 molecular weight range. Conversely, when preparing polymers containing about 65% by weight short chain ester units, it may be desirable to employ a second dicarboxylic acid and/or low molecular weight diol in combination with a poly(alkylene oxide) glycol having a molecular weight in the lower part of the 600–6000 range.

The properties of this polymer can be modified by the incorporation of fillers and plasticizers. Generally only minor amounts of filler would be added when the polymer is used as a binder because of the increase in melt viscosity caused by the filler. Certain plasticizers may be added in limited amounts and may be advantageous on occasion because their presence lowers the melt viscosity of the polymer. Nitrate esters, such as nitroglycerine, are useful plasticizers which increase the energy available from a propellant. Furthermore, a nucleating agent such as the sodium salts of stearic or dimer acid may be incorporated into the polymer to increase its rate of crystallization.

As noted herein before, the polymer of this invention is characterized by a melting point low enough to permit blending with finely divided propellant oxidizers as well as a low melt viscosity which permits mixing with oxidizer under low shear conditions. At the same time, the polymer exhibits useful mechanical properties such as tensile strength and elongation at break over a temperature range extending from −40° C. to about 80° C.

The following examples illustrate the invention in which parts are by weight unless otherwise indicated.

The following ASTM methods are employed in determining the properties of polymers prepared in the examples which follow:

| | |
|---|---|
| Modulus at 100% elongation*, $M_{100}$ | D412 |
| Modulus at 300% elongation*, $M_{300}$ | D412 |
| Modulus at 500% elongation*, $M_{300}$ | D412 |
| Tensile at Break*, $T_B$ | D412 |
| Elongation at Break*, $E_B$ | D412 |
| Tear Resistance, Die C | D624 |
| Melt Index** | D1238 |

*Cross-head speed 50 cm/minute
**2160 g load, temperature 120° C., drying conditions: 2 hours at 80° C.

Inherent viscosity of the polymers in the following examples is measured at 30° C. at a concentration of 0.1 g/dl in m-cresol.

The following catalyst is used in preparing the copolyesters of the examples:

CATALYST

To 425 parts of anhydrous 1,4-butanediol in a round bottom flask is added 23.32 parts of tetrabutyl titanate. The mixture is agitated at 50° C. for 2–3 hours until the small amount of solids orginally present disappear.

EXAMPLE 1

The following procedure is used for the preparation of the copolyesters of this invention.

Copolyester 1A is prepared by placing the following materials in an agitated flask fitted for distillation:

| | |
|---|---|
| Poly(tetramethylene oxide) glycol; number average molecular weight about 1000 | 32.7 parts |
| 1,4-Butanediol | 18.1 parts |
| Dimethyl Isophthalate | 31.5 parts |
| N,N'-Hexamethylenebis(3,5-di-tert-butyl-4-hydroxy-hydrocinnamamide) | 0.15 parts |
| Catalyst | 3.3 parts |

A stainless steel stirrer with a paddle cut to conform with the internal radius of the flask is positioned about 1/8" from the bottom of the flask and agitation is started. The flask is placed in an oil bath at 160° C., agitated for five minutes and then the catalyst is added. Methanol distills from the reaction mixture as the temperature is slowly raised to 250° C. over a period of one hour. When the temperature reaches 250° C. the pressure is gradually reduced to 40 Pa within 20 minutes. The polymerization mass is agitated at 250° C./40 Pa for 35 minutes. The resulting viscous molten product is scraped from the flask in a nitrogen (water and oxygen free) atmosphere and allowed to cool. The inherent viscosity of the polymer is 1.0 dl/g and the melt index measured at 120° C. is 9.2 g/10 min. After crystallization the polymer is dried in an air circulated oven at 80° C. and compression molded in a press at about 120° C. to a 1.0 mm thick slab. The physical properties of Copolyester 1A were determined according to the ASTM methods specified above.

For control purposes, Copolyester 1B is prepared by substantially repeating the preparation of Copolyester 1A except that polymerization time was increased to 45 min. The resulting polymer had an inherent viscosity of 1.57 dl/g and a melt index of 0.7 g/10 min.

The physical properties of both polymers are shown in Table I.

TABLE I

| | Polymer 1A | Control Polymer 1B |
|---|---|---|
| Short chain ester units, wt. % | 44 | 44 |
| Melting point, °C.* | 107 | 106 |
| Melt index at 120° C., g/10 min | 9.2 | 0.7 |
| $M_{100}$, MPa | 6.2 | 6.2 |
| $M_{300}$, MPa | 8.7 | 9.8 |
| $T_B$, MPa | 22.7 | 35.2 |
| $E_B$, % | 700 | 710 |
| Tear resistance, Die C, kN | 68.3 | 94.6 |

*determined by Differential Scanning Calorimetry (maximum of endotherm)

The data show that Polymer 1A exhibits an unexpectedly high level of physical properties in spite of its 13 fold lower melt viscosity compared to Control Polymer 1B. Because of its very high melt viscosity Control Polymer 1B is not suitable for use as an explosive binder, even after incorporation of plasticizers.

EXAMPLE 2

The procedure for preparing Copolyester 1A was substantially repeated with the following starting materials:

| | |
|---|---|
| Poly(ethylene oxide) glycol; number average molecular weight about 1000 | 37.7 parts |
| 1,4-Butanediol | 20.5 parts |
| Dimethyl isophthalate | 31.5 parts |
| Trimellitic anhydride | 0.06 parts |
| 1,3,5-Trimethyl-2,4,6-tri-(3,5-di-tert.-butyl-4-hydroxylbenzyl) benzene | 0.2 parts |
| Catalyst | 3.0 parts |

The resulting polymer (Copolyester 2) containing 39% by weight short chain ester units had a melt index of 4.2 g/10 min and exhibited a similar level of physical properties as Copolyester 1A of Example 1. Because of its high oxygen content Copolyester 2 is particularly suited as a binder for high energy propellants.

EXAMPLE 3

Copolyester 3 containing a lower proportion of short chain ester units was prepared by substantially the same procedure as described above from the following materials:

| | |
|---|---|
| Poly(tetramethylene oxide) glycol; number average molecular weight about 2000 | 39.4 parts |
| 1,4-Butanediol | 18.0 parts |
| Dimethyl isophthalate | 19.7 parts |
| 4,4'-bis(alpha-alpha-dimethylbenzyl) diphenylamine | 0.6 parts |
| Catalyst | 3.0 parts |

The resulting polymer had a melt index of 4.5 measured at 120° C. and a calculated short chain ester unit content of 34% by weight. The copolyester did not exhibit any tackiness when exposed to a temperature of 80° C. The physical properties of Copolyester 3 are shown in Table II.

TABLE II

| | Copolyester 3 |
|---|---|
| $M_{100}$, MPa | 3.9 |
| $M_{300}$, MPa | 5.4 |
| $T_B$, MPa | >13.8 |
| $E_B$, % | >1000 |
| tear resistance, Die C. kN | 47.4 |

This polymer is particularly suited as a binder for high energy propellants.

EXAMPLE 4

Copolyester 4 containing two different short chain ester units was prepared by substantially the same procedure as described above from the following materials:

| | |
|---|---|
| Poly(ethylene oxide) glycol; number average molecular weight about 4000 | 26.1 parts |
| 1,4-Butanediol | 20.0 parts |
| Dimethyl isophthalate | 24.25 parts |
| Dimethyl terephthalate | 6.07 parts |
| Trimellitic anhydride | 0.05 part |
| 1,3,5-Trimethyl-2,4,6-tri[3,5-di-tert.-butyl-4-hydroxybenzyl] benzene | 0.2 part |
| Catalyst | 3.6 parts |

The resulting polymer had a short chain ester unit content of 55% by weight of which 80% consisted of butylene isophthalate units. The copolyester had a melt index of 20.3 g/10 min. The copolyester did not exhibit any tackiness when maintained at a temperature of 80° C. and is suitable for use as a binder for high energy explosives and propellants. The physical properties of Copolyester 4 are shown in Table III.

TABLE III

| | Copolyester 4 |
|---|---|
| Melting point, °C. | 103 |
| $M_{100}$, MPa | 5.2 |
| $M_{300}$, MPa | 7.2 |
| $T_B$, MPa | 10.3 |
| $E_B$, % | 1100 |
| Tear resistance, Die C. kN | 58.0 |

I claim:
1. A segmented thermoplastic copolyester elastomer consisting essentially of a multiplicity of recurring intralinear long chain and short chain ester units connected head-to-tail through ester linkages, said long chain ester units being represented by the following structure:

(a)

and said short chain ester units being represented by the following structure:

(b)

wherein